July 1, 1958   E. A. EBERT   2,841,113
HABITAT OR MATRIX FOR LIVE BAIT TYPE CREATURES
AS WORMS, CRAYFISH OR HELGRAMITES
Filed Aug. 17, 1956

INVENTOR.

Edward A. Ebert

2,841,113

HABITAT OR MATRIX FOR LIVE BAIT TYPE CREATURES AS WORMS, CRAYFISH OR HELGRAMITES

Edward A. Ebert, Snyder, N. Y.

Application August 17, 1956, Serial No. 604,664

1 Claim. (Cl. 119—1)

This invention relates to bedding material in which fishing bait creatures, such as worms, crayfish and helgramites may be kept in a lively condition for prolonged periods of time and to a means for keeping such bait creatures in healthy, active condition.

More particularly the invention proposes the control of the manufacture of an artificial product, namely, cellulose sponge, to provide advantages not inherent in any one natural material.

Heretofore natural materials, such as sphagnum moss, peat moss, leaves, sea weed, granular materials and ground fibers have been used. However, all of these materials have one or more of the following faults, namely, they tend to readily mat down, break up into smaller bits, turn sour and mold, all to the detriment of the worms.

This invention eliminates the above defects and has among its objects the following:

To provide a matrix having a large moisture retention;

To provide a matrix having interconnected cellular voids of variable sizes;

To provide irregularly-shaped pieces or chunks of a matrix of variable size so that when mixed, these chunks will lay together in contact with each other without leaving large voids between them;

To provide a matrix which is strong enough when moisture-laden to maintain its open, cellular structure and not mat down when laid in a pile exceeding several inches;

To provide a matrix which when laid in a pile exceeding several inches, will retain moisture of practically equal amount throughout from top to bottom;

To provide an open material which will permit normal air currents to readily pass through its mass to replace used oxygen and expel stale air;

To provide a material which will maintain its labyrinth structure and not break up into fines, and also resist molding and rotting.

Figure 1:
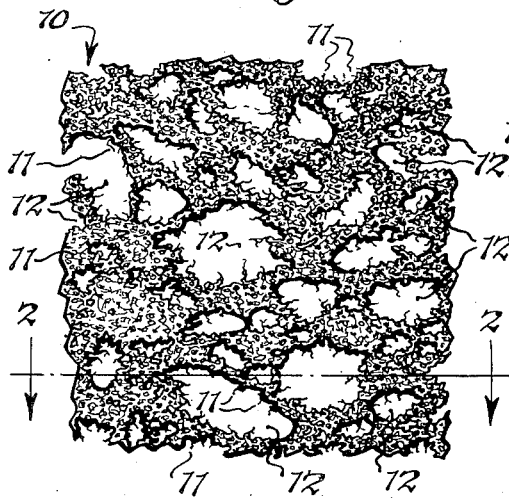
Fig. 1 is a cross section, greatly enlarged, taken through a slab of the matrix.
Figure 2:
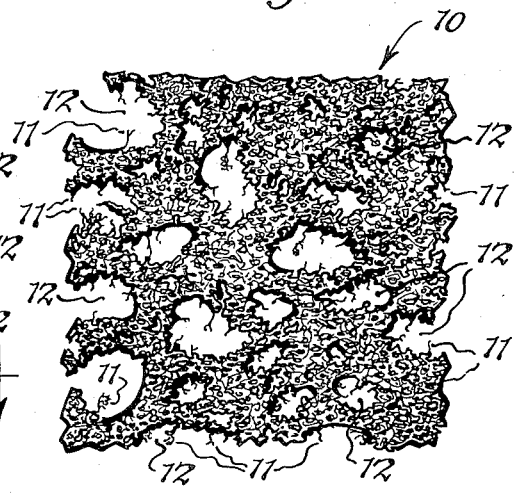
Fig. 2 is another cross section, greatly enlarged, taken at a right angle to the plane shown in Fig. 1, along the line 2—2 of that figure.

As will be seen in Figs. 1 and 2, cross sections through this material in any plane gives an almost uniform texture of fibrous mass and voids of diverse size. The mass 10 comprises a lace-like structure or maze of individual protruding fibers 11 attached one to another, interspersed by openings or voids 12 of varied size.

This cellulose sponge can be made in various densities, the more open or lighter, having larger voids than the denser type. Sponge having a density such that essentially the largest voids having a cross-sectional area of approximately not larger than about 3/8 in. in diameter, or about .11 square inch, gives satisfactory results. Of course these larger voids will be dispersed among smaller voids of various dimensions.

Figure 3:
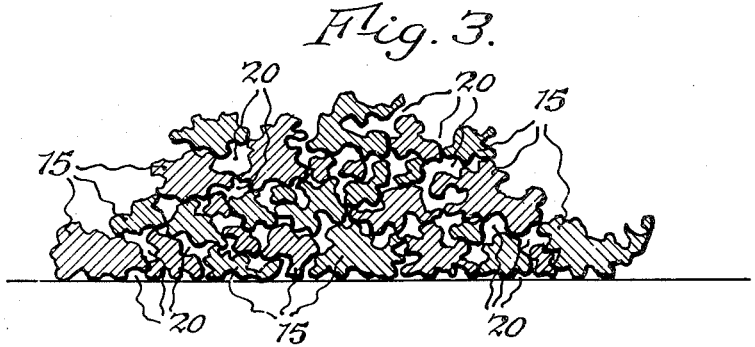
Fig. 3 illustrates a mount of varied size chunks after the material has been reduced to size for use.

Blocks, ends or sheets of this sponge are reduced into a variety of irregular-shaped chunks and pieces 15 as shown in Fig. 3. Preferably these chunks and pieces 15 are made of sizes in proper proportion so that when the pieces are saturated with water and fully expanded they will lie together in a mass so that the largest portion of the voids or spaces 20 between their faces i. e. one face against the face of another, will not be greater than approximately 3/8 inch in any direction. Very satisfactory results were obtained with the large pieces having a volume equal to approximately a 5/8 in. cube or about .25 cubic inch, plus intermediate varied sizes down to the smallest having a volume equal to approximately a 1/16 inch cube or about .0002 cubic inch.

If chunks of too large a size are used, very large cavities between the chunks occur. Likewise, if pieces too small are used, a dense, non-cavitated material results. Neither of these two extremes is desirable. In its use for garden worms, it is desirable to have this moisture-retaining, fibrous, cellular sponge in maximum contact with the worm's body. Since a garden worm neither has gills or lungs, it gets its oxygen or air through blood circulating in the capillaries close to the moist cuticle of the body wall. This body wall receives oxygen through contact with moist air or by contact with the saturated, fibrous, cellular sponge in which moisture already has dissolved oxygen in it because of the airy, lace-like structure of the sponge that allows normal air currents to pass freely through it. This same body wall of the worm gives up carbon dioxide which will be disposed of by the normal air currents.

If pieces of too small a size are used, the mass becomes too dense and normal air currents cannot pass through it so that the mass accumulates cuticle or body slime, wastes and gas and soon becomes uninhabitable.

When the sizes of cellulose sponge aforementioned are used, it has been found that the garden worms will naturally disperse themselves apart from one another and locate throughout the mass. This is the most healthy and desirable condition and is due to good aeration and moisture distribution. In cellulose sponge, absorption is unusually high, and it will absorb twenty times its own weight in water. The capillary fibers carry this water several inches in height and it does not readily break down into small fines and it may be boiled and reused.

Worms will readily crawl into a large cellulose sponge block but will break in half before they can be removed because their bristle-like setae will hold fast to walls of the passage they enter; therefore, large, solid blocks of sponge cannot be used. On the other hand, finely ground sponge is not any more satisfactory than the natural products ordinarily used, such as sphagnum moss, peat moss, leaves, sea weed, granular materials and ground fibers. These all break down into a fine matted mass which is difficult to aerate and which encourages decomposition.

When used for crayfish and similar baits having gills, the high capillary attraction of the fibrous, cellulose sponge in contact with their bodies readily provides them with the necessary humid atmosphere, body moisture and aeration they require.

Further it has been found that considerable evaporative cooling takes place when dry air normally passes through these moist sponge chunks.

It has also been found that when a worm dies in this sponge a ball will form of the remains of the worm but with the greater part of the ball being composed of sponge pieces. The parts of this ball stay together and apparently are sealed off from the rest of the chunks of loose sponge. No apparent odor occurs, but the ball will also include a fungus or mold in patches on its surface. Normally when one or two worms die in ordinary beddings a strong odor of decay is present and within a few hours all of the worms will die.

Another observation made was that after keeping worms for eight continuous weeks in this sponge without any addition of food, the volume of sponge used at the start of the test period had been reduced to about one-third to one quarter of its original volume. Since the worms at the end of this period of time were still fat and healthy, the obvious conclusion was that they had eaten this two thirds or three quarters and reduced it to excrement matter which was noticeably present.

From the foregoing it will be obvious that neither large, solid or finely ground pieces of cellulose sponge will make up a satisfactory bedding for the keeping of worms or other bait, but by following the teaching herein disclosed a product having superior qualities may be made.

It will be understood that various changes in the details and conditions which have been herein above described in order to explain the nature of the invention may be made by those skilled in the art within the principle and scope of the invention as expressed in the appended claim.

I claim:

A mass of cellular fibrous cellulose sponge for the keeping in healthy active state for long periods of time of live fish worms and the like live fish bait commingled therewith, said mass consisting substantially exclusively of a multitude of individual, irregularly shaped, ragged edged chunks of said sponge containing protruding fibers, said chunks when damp and freely expanded varying in size, the larger of said pieces essentially having individually a volume not exceeding approximately .25 cubic inch whereby normal sized fish worms are incapable of nesting in a single chunk to impede removal thereof and the smaller of said chunks essentially having individually a volume not smaller than approximately .0002 cubic inch whereby air circulates through the garden worms and chunks to evaporatively cool and supply oxygen to the worms, said fibers and cellulose providing food and moisture for the worms, thereby to keep them in healthy condition.

References Cited in the file of this patent

UNITED STATES PATENTS

| | | |
|---|---|---|
| 1,778,629 | Elam | Oct. 14, 1930 |
| 2,014,900 | Lapp | Sept. 17, 1935 |
| 2,035,286 | Wenzel | Mar. 24, 1936 |
| 2,295,823 | Banigan et al. | Sept. 15, 1942 |
| 2,704,531 | Bailey | Mar. 22, 1955 |

FOREIGN PATENTS

| | | |
|---|---|---|
| 1,070,031 | France | Feb. 17, 1954 |